May 17, 1966  R. TATSCH  3,251,382
FOLDABLE CONDUIT STRUCTURE
Original Filed July 17, 1961  2 Sheets-Sheet 1
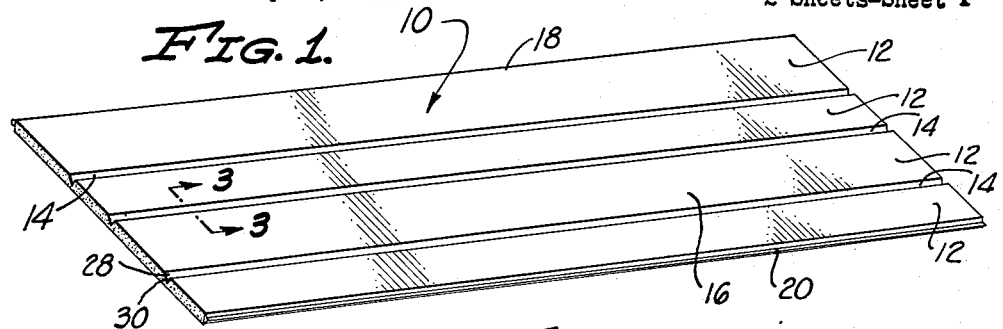
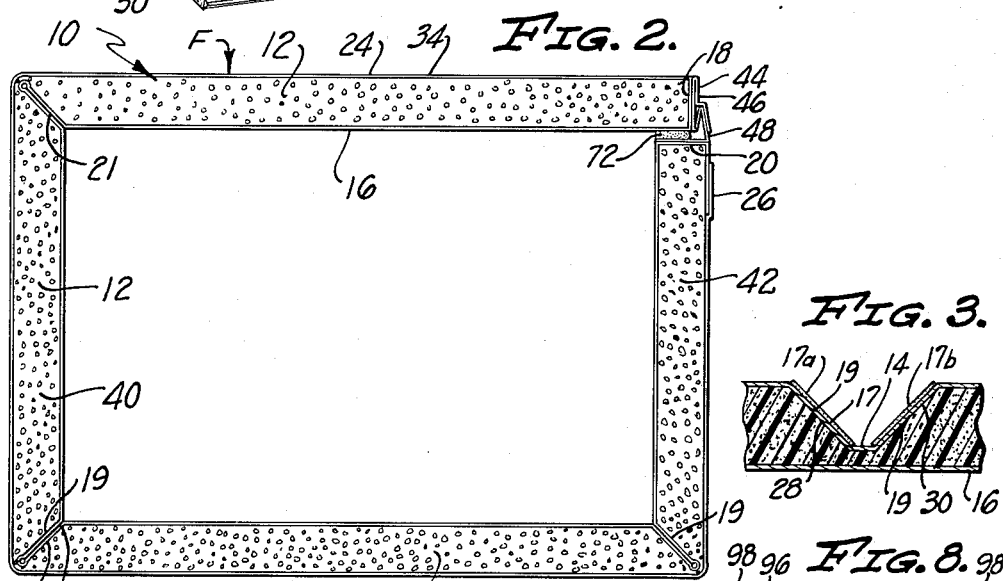
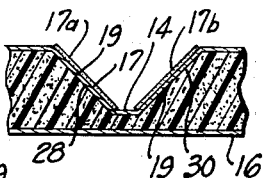
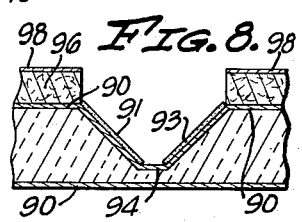
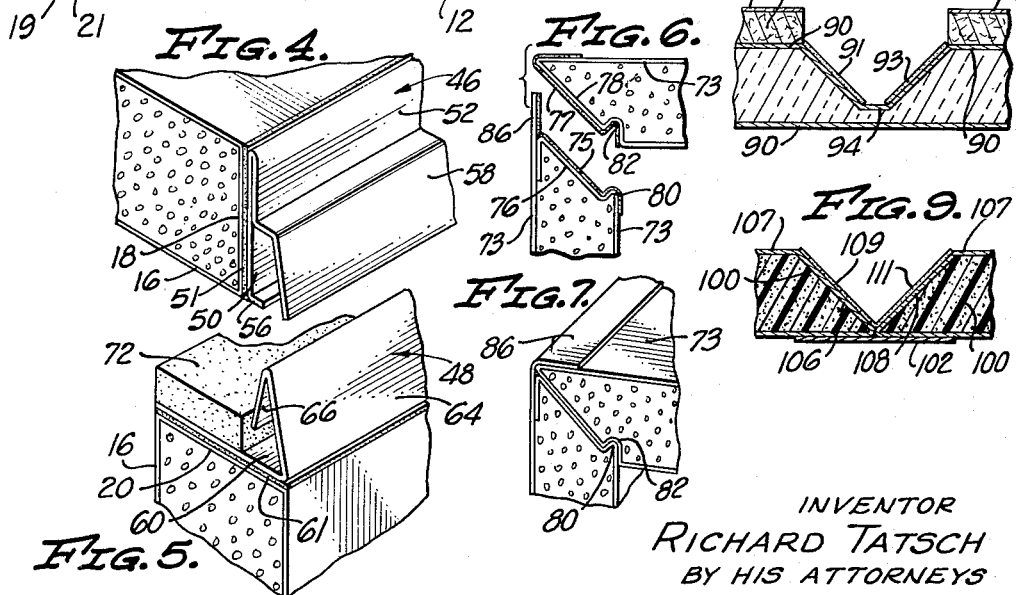
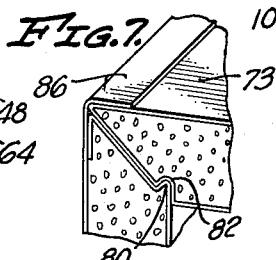
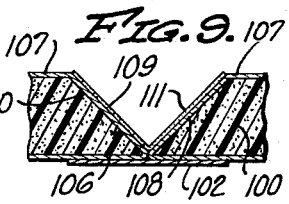
INVENTOR
RICHARD TATSCH
BY HIS ATTORNEYS
HARRIS, KIECH, RUSSELL & KERN May 17, 1966  R. TATSCH  3,251,382
FOLDABLE CONDUIT STRUCTURE
Original Filed July 17, 1961  2 Sheets-Sheet 2
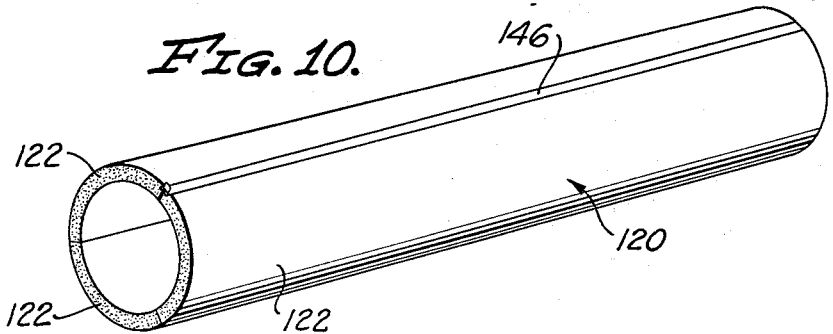
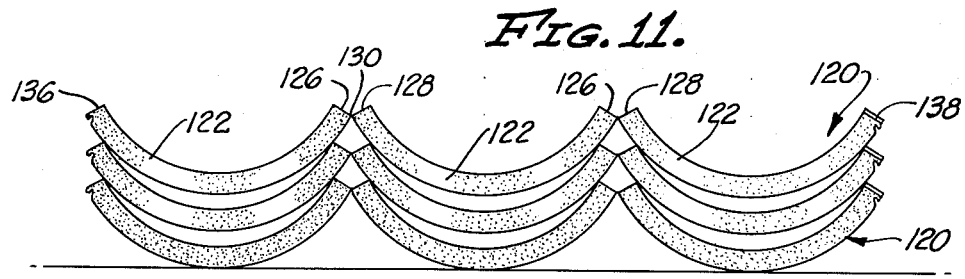
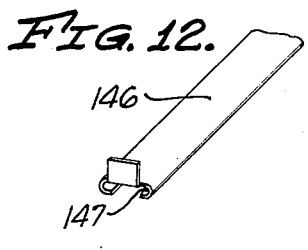
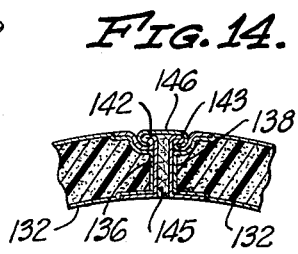
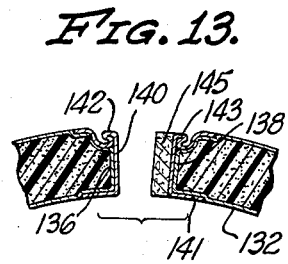
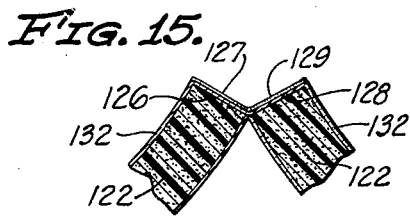
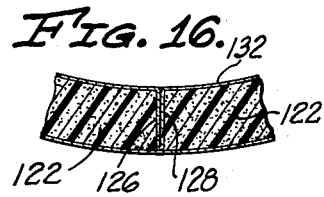
INVENTOR
RICHARD TATSCH
BY HIS ATTORNEYS
HARRIS, KIECH, RUSSELL & KERN

United States Patent Office 3,251,382
Patented May 17, 1966

3,251,382
FOLDABLE CONDUIT STRUCTURE
Richard Tatsch, 1410 W. 6th St., Silver City, N. Mex.
Continuation of application Ser. No. 124,530, July 17,
1961. This application June 24, 1963, Ser. No. 289,896
7 Claims. (Cl. 138—151)

The instant patent application is a continuation of co-pending application Serial No. 124,530, filed July 17, 1961, and now abandoned.

This invention relates to self-insulated conduits used for the distribution of air in the heating, cooling and ventilating of buildings.

Until recently air conduits used in homes and industrial construction were most frequently insulated by wrapping suitable insulation sheeting about the installed conduit. A more recent development involves the use of insulated boards shaped to form air conduits. Various insulation boards including glass fiber mats have been employed. Considerable interest has been recently shown in the use of insulation boards formed from plastic foam materials such as polyurethanes, polystyrenes, and other synthetic resins that are subject to foaming.

An air conduit of good design should have walls of low thermal conductivity and be relatively moisture impermeable and preferably of a rigid structure. The material employed in the conduit should be fire-resistant and of adequate strength to avoid breakage. A conduit preferably possesses sound absorbing properties and is characterized by freedom from attack by bacteria and algae. The conduit should be free from odor and the material used should not fray at higher air velocities. Conduits made of plastic foam materials satisfactorily fulfill most of the foregoing requirements of a good conduit. However, while the plastic foam materials generally have good compressive and tensile strengths in relation to their densities at normal room temperatures, their strengths progressively decline in the presence of increasing temperatures. A thin protective skin of, for example, aluminum foil bonded to a foam polyurethane board will provide effective protection against high temperatures. However, upon exposure to extreme heat or fire, the aluminum skin may be released from the polyurethane core through rupture of adjacent foam cells, leading to exposure of the foam material as the skin crumbles and falls away. Once ignited the polyurethane, as well as many of the other foam plastics including polystyrene, will burn. It is possible to modify polyurethane and some of the other plastics to render them self-extinguishable upon flame removal but at an increase in cost, and at a sacrifice and impairment of physical properties, particularly a significant decrease in strength. Despite the reduction in strength characteristic of modified polyurethane and other modified foam plastics, their use has been preferred to the unmodified foam plastics as a precautionary measure to guard against the possibility of the aluminum foil skin or the like peeling away from the inside wall of the foam plastic upon exposure to high temperatures.

It is the object of this invention to provide an improved self-insulated air conduit of the sandwich panel type. A still further object is to provide a conduit structure which permits a more effective use of foam, synthetic resin cores, protected and reinforced in an improved manner by thin skins. A still further object is to provide an improved conduit structure wherein the possibility of the thin protective skin peeling away from the foam core material is substantially reduced.

The improved self-insulated air conduit of the invention which is formed of adjoining insulation panels is provided with a thin incombustible structure member stretched over the inner wall of at least one of the panels and bonded thereto. The thin structural member is anchored at its opposite ends by extensions which reach into enclosed areas between the covered panel and the adjoining panels on either side. Each of the extensions has at least a portion of its length out of alignment with the thin structural member proper and is bonded to the insulation panel within the enclosed area between the adjoining panels, thus providing anchorage for the thin incombustible structural member away from direct heat to which the structural member proper may be exposed. The placement of the extension out of alignment with the thin structural skin provides further anchorage. The thin structural member is preferably formed of metal foil such as aluminum foil, but may take the form of an open wire meshwork, made of glass fibers or fine galvanized steel wire. Where the open meshwork form of the structural member is utilized, it is necessary to provide an additional inner layer formed of a heat insulating refractory material such as a thin asbestos mat or a glass fiber mat to protect the insulation panel. Where an open meshwork thin structural member is used, the member serves strictly in the role of a structural reinforcing member. Where a thin metal foil is employed, the thin structural member serves in a dual role, both as a structural reinforcement and as a heat shield for the insulation panel.

The improved gas or air conduit of the invention in its preferred form is shipped to the installation site in a collapsed or unfolded state. It will be appreciated that the space required for the transportation of bulky objects such as air conduits will be significantly reduced if the conduits are shipped in a collapsed form, piled one upon another. One form of the self-insulated air conduit of the invention has a rectangular cross section when erected and in its unfolded or collapsed state it assumes a sheet form. The air conduit in its sheet form comprises four parallel and elongated juxtaposed panels formed of rigid plastic foam material with the longitudinal edges of adjoining panels being beveled to provide therebetween elongated, longitudinal V-shaped notches. A thin, incombustible structural skin covers each panel, extending into the adjacent V-notches, and is bonded to the panel. The sheet structure upon being folded at the V-notches to its erected rectangular form defines a conduit having for its four sides the four foam panels with the structural skin of each panel providing an inner wall and being anchored in the corners enclosed by the folded V-notches. In the erected conduit, the skin-covered beveled faces of the former V-notches are in abutting engagement. Means are provided for fastening the two longitudinal edges of the folded sheet together. Preferably, a single elongated structural skin is employed to cover all four panels with portions of the skin extending into the respective V-notches between the adjacent panels. The unfolded sheet is preferably a continuous structure of plastic foam material with the elongated, longitudinal V-shaped notches being cut out from one face of the plastic foam sheet to provide hinge lines between adjacent panels. The four panels may be separate structures and held together in the sheet form by a common structural skin.

Another form of the improved air conduit of the invention has a circular cross section when erected. The round gas conduit comprises in its collapsed state at least two elongated segments, each of the segments having an arcuate cross section and being made of a rigid plastic foam material. The segments with the conduit in its collapsed state assume parallel, juxtaposed positions with the edge walls of immediately adjacent panels providing in end view a V-shaped notch. A thin incombustible structural skin covers and is bonded to the concave inner wall of each segment and to the edge walls of the segment. The structural skin provides a hinge line between adjacent segments lengthwise of the respective V-notches. Means are provided for fastening the unattached edges of the two outside segments together when the conduit is folded to its erected form. Preferably the outside walls of the several segments are covered by a thin incombustible structural skin.

Various plastic foams may be formed in rigid board form for use in the improved conduit of the invention. A polyurethane type foam is the preferred construction material. Most of the important thermal setting synthetic resins may be used to make plastic foams, including the various epoxies and phenolic resins. However, most of the materials except polyurethane and polystyrene are too expensive for construction use. Various methods are employed to prepare foams from the different plastics. For example, the polyurethane may be foamed through the chemical reaction of isocyanate with water to liberate carbon dioxide gas, with the carbon dioxide providing the foaming action needed to expand the material. Refrigerant gases are also used for the expansion of the polyurethane foam as well as other plastic foams. The refrigerant gases include materials such as DuPont's Freon which is composed of chlorofluorinated hydrocarbons or General Chemicals Division, Allied Chemical Corporation's Genetron 11, trichloromonofluoromethane. The refrigerant gas blown polyurethane is the preferred foam material for use in the improved conduit of the invention. An unmodified (i.e., containing no additive to render the plastic self-extinguishable) refrigerant gas blown polyurethane sandwiched between incombustible thin skins of, for example, aluminum foil, provides a superior structure of high strength and a structure which is not a fire contributor because, if exposed to flame by a small skin cut, the rupturing foam cells will emit refrigerant gas to smother the flame.

Vinylchloride resins are generally formed by incorporating a volatile material and heating. Many of the other plastics, including the epoxies, are formed by heat curing in the presence of a chemical blowing agent; that is, a material which is instable at an elevated temperature, providing a foaming gas such as carbon dioxide or nitrogen. Various foaming agents are available, including metals which react with acid and liberate hydrogen, nitrates or azo compounds which evolve nitrogen, sulfohydrazides, and diazonium salts. Details as to the composition of the various liquid foam plastic blends and the method of foaming will not be reviewed here as all of this information is known to the art and does not form a part of the instant invention. Various books of the Reinhold Plastics Applications Series published by the Reinhold Publishing Company, New York, provide data and information on many of the plastic materials that may be used. Particular reference is made to the volume of the Plastics Applications Series entitled "Polyurethanes" by Bernard A. Dombrow, copyrighted 1957; "Epoxy Resins" by Irving Skeist, copyrighter 1958; and "Phenolic Resins" by David F. Gould, copyrighted 1959.

The thin structural skin of the improved conduit is preferably made of a metal foil, for example, aluminum foil. The term foil is used herein to describe very thin metal nonselfsupporting sheeting. Normally the thickness of the foil will be in the range of 0.0015 inch to 0.008 inch. However, a foil thicker or thinner than the aforementioned range may be employed.

These and other advantages of the improved air conduit structure will become more apparent from the following specification and the accompanying drawings which are for the purpose of illustration only, and in which:

FIG. 1 is an isometric view of a preferred embodiment of the improved conduit of the invention in its open, unfolded state;

FIG. 2 is an enlarged, end view of the structure of FIG. 1 in its folded, erected form;

FIG. 3 is a fragmentary, enlarged view taken from the site of line 3—3 of FIG. 1, illustrating in detail the construction of the area between adjacent panels of FIG. 1;

FIG. 4 is an isometric view of one-half of a snap locking means used for closing the conduit structure of FIGS. 1 and 2;

FIG. 5 is an isometric view of the complementary member of the snap locking means used with that illustrated in FIG. 4;

FIG. 6 is an end view of another form of locking means, immediately preceding the locking of the two members together;

FIG. 7 is an isometric view showing the locking means of FIG. 6 in its locked form;

FIG. 8 is a fragmentary, enlarged view taken generally from the site of line 3—3 of FIG. 1, illustrating another modification of the conduit of the invention;

FIG. 9 is a fragmentary, enlarged view of a second modification of the conduit of the invention, taken generally from the site of line 3—3 of FIG. 1;

FIG. 10 is an isometric view of a circular embodiment of the improved conduit of the invention, formed of three arcuate, elongated segments;

FIG. 11 is an end view illustrating three conduits of the type shown in FIG. 10 in their unfolded open form piled one upon another;

FIG. 12 is an isometric view of a drive cleat forming one component of the closure means of FIG. 10;

FIG. 13 is an enlarged fragmentory end view of the closure means carried by the opposed free ends of the conduit of FIG. 10;

FIG. 14 is an enlarged, fragmentary end view illustrating the closure means of FIGS. 12 and 13 in their secured form;

FIG. 15 is an enlarged, fragmentary end view of end walls of two adjoining segments of the unfolded conduits of FIG. 11; and FIG. 16 is an enlarged, fragmentary end view of the two segments of FIG. 15 in their erected form as illustrated in FIG. 10.

A foldup conduit structure 10 is illustrated in its erected form in FIG. 2 and in its open, collapsed form in FIG. 1. The conduit comprises a continuous sheet or board of rigid polyurethane foam which in its collapsed state has four, parallel, elongated, juxtaposed panels 12.

In the particular embodiment illustrated in FIGS, 1, 2, and 3 the structure is a continuous polyurethane board sheet which has had spaced V-shaped segments cut from one surface providing three V-shaped notches 14 which run the length of the board sheet, and which furnish hinge lines about which the board sheet may be shaped into the rectangular conduit of FIG. 2.

A foil structural skin 16, preferably made of aluminum, covers the side of the board sheet having the V-notches 14. The foil skin 16 conforms to the configuration of the V-notches 14 and in addition covers the opposite longitudinal perpendicular edges 18 and 20 of the polyurethane board sheet. In the particular embodiment illustrated in FIGS. 1 and 2, the aluminum foil skin 16 continues around the edges 18 and 20 of the polyurethane board sheet and covers the outside face 24 with the opposite edges of the foil skin lapping at 26, as indicated in FIG. 2. Various adhesives are available for bonding the foil skin to the polyurethane board. Among these adhesives are the contact rubber or latex base materials such as Minnesota Mining & Manufacturing Company's product EC11–28 which is an oil soluble elastomer. A particularly suitable solvent for use with polyurethane and the foregoing type of rubber base elastomer is petroleum naphtha. The more expensive silicone resin type adhesives may be employed and are desirably used where there is a lap of the aluminum foil on the interior surface of the conduit. The latter silicone resin type adhesives will withstand temperatures as high as 2000° F.

Each of the V-notches 14 has two opposed beveled faces 28 and 30 (see FIG. 3) covered as mentioned before with the aluminum foil 16 and with the aluminum foil in turn being coated with a coating 17 of suitable solvent activated synthetic rubber elastomer of the type described before. The surfaces 17a and 17b of the beveled faces 28 and 30 are wet with the solvent immediately before folding of the conduit to its erected form. It will be appreciated that a contact type rubber adhesive sets upon evaporation of the solvent.

Reference to FIG. 2 will show that the portion 19 of foil skin covering each V-notch 14 is anchored within a closed area 21 when the sheet is erected, the portions 19 thus being away from exposure to possible high temperatures of the air flowing through the conduit. This is a particularly desirable feature of the conduit of the invention as it assures that the taut skin 16 covering each of the panels 12 will be retained in place even though cells of the plastic foam immediately adjoining the aluminum skin of the panel proper may rupture, loosening the foil skin from the polyurethane core.

The foil skin 16 provides structural rigidity and significantly reinforces the polyurethane board. With reference to FIG. 2, a force F, for example, the weight of a man standing on the conduit, is applied to a top wall 34 of the conduit 10. The top wall 34 which functions as a beam transmits the force to perpendicular side walls 40 and 42 which oppose the load and transmit it to the structure of the building. The exterior skin covering the outside face of the top wall 34 reinforces the wall against a loading on the top of the conduit while the interior skin covering the inner face of the top wall 34 acts also as a reinforcement against a loading on the top of the conduit and is stressed under the foregoing loading. It will be appreciated that the extending of the foil skin 16 well past the inner faces of the vertical side walls 40 and 42 into the enclosed areas 21 improves the beam load bearing capacity as compared to the bearing capacity available if the skin had stopped at the interior faces of the side walls 40 or 42, or had been turned downwardly as a continuing skin without extending into the enclosed areas 21. Continuation of the aluminum skins to cover the longitudinal edges 18 and 20 supplements the anchorage provided by the aluminum foil covered beveled faces 28 and 30 of the V-notches.

A snap locking means 44 is provided for fastening together the opposite edges of the polyurethane board sheet when the conduit is placed in its erected form. The snap locking means 44 has a first portion 46 affixed to the edge 18 and a complementary portion 48 held to the other edge 20. The portion 46 has a light metal base 50 bonded to the foil covering the edge 18 by a contact adhesive layer 51 which base 50 is integrally formed with a leg member 52 which is spaced from and parallels the base 50 about half the width of the base. The base 50 has a short outwardly extending locking wall 56 at the inside end of the base and away from the aforementioned leg member 52. The leg member 52 at its lower end projects outwardly and carries a downwardly and outwardly extending wall 58 which defines a retaining channel between its underside and the base 50. The other portion 48 of the snap locking means 44 is similarly held by a light metal base 60 and contact adhesive layer 61 to the foil of other edge 20. The outer edge of base 60 has an upwardly and inwardly projecting wall 64 which, when the snap locking means is locked, engages the interior face of the wall 58 of the other portion 46. A resilient spring locking wall 66 extends downwardly and inwardly from the upper end of the wall 64. The lower end of the locking wall 66 operatively engages the inside surface of the locking wall 56 of the other portion 46 of the snap locking means. The inner upper surface of the base 60 supports a flexible, high temperature resistant vinyl sponge member 72. The exposed interior surface of the vinyl sponge member 72 may be covered with a light foil member that is cemented thereto.

Another and simplified locking means is illustrated in FIGS. 6 and 7. Unlike the earlier described locking means, the means of FIGS. 6 and 7 does not automatically snap lock together but relies primarily on the contact cement. Again the abutting edges (in this embodiment the edges are beveled) are covered with a light aluminum foil 73 as are the outer and inner wall surfaces of the structure. Opposite edge faces 76 and 78 are provided respectively with an elongated tongue 80 and an elongated groove 82. In the locked form, as best seen in FIG. 7, the tongue 80 seats in the groove 82. The opposite faces 76 and 78 are coated with contact synthetic rubber adhesive layers 75 and 77. After the two faces 76 and 78 are bonded together, an extension 86 of aluminum foil skin 73 is bent over and bonded against the outer surface of the upper wall.

The structure of FIG. 8 is an alternative of that illustrated in FIG. 3. In this alternative embodiment, the aluminum foil skin is replaced by an open mesh structure 90 of glass fiber or steel wire. As before, the glass fiber mesh is anchored in the interstice formed by a V-notch 94. The glass fiber or steel wire mesh is in turn covered by an asbestos or glass fiber mat 96 whose inner surface is coated with a vinyl or neoprene film 98. The opposite sides of the V-notch 94 are coated with layers 91 and 93 of a contact type latex adhesive.

The embodiment of FIG. 9 differs from that in FIG. 3 in that the polyurethane sheet is not continuous but is made up of four distinct panels 100 which on their outer surfaces are held together at their adjoining edges by a tie member 102 which may be conveniently made of a heavy aluminum foil held in place by a rubber contact adhesive. As before, the inner face of the conduit including the beveled surfaces 106, 108 of the V-notch are covered with an aluminum foil 107. The contact adhesive layers 109 and 111 coat the opposite surfaces of the V-notch.

A circular duct 120 containing the features of the invention is illustrated in FIGS. 10 and 11 where it is seen to be formed of three arcuate segments 122. As illustrated in FIG. 11, the duct 120 in its collapsed state has its three segments 122 in parallel and juxtaposed positions with edge walls 126 and 128 of immediately adjacent segments providing in end view a V-shaped notch 130. A thin incombustible structural skin 132 preferably made of aluminum foil is bonded to the concave inner wall of each segment 122 and covers the edge walls 126 and 128 of adjacent segments, thus providing a hinge line between the segments lengthwise of the respective V-notches. The edge walls 126 and 128 are respectively coated with contact rubber adhesive layers 127 and 129 (see FIG. 15). The aluminum foil skin 132 also covers the outside edge walls 136 and 138 of the two outside arcuate segments 122. Preferably, the foil skin continues unbroken around the outside convex surfaces of the three segments 122. It will be seen that with this structure the aluminum foil skin 132 provides hinges between adjoining arcuate segments and also by covering the edge walls 136, 138, 126, and 128 assures anchorage of the inner skin foil in the event flame or high temperature air should loosen the skin from the inner wall of any of the three segments 122. The outside edge walls 136 and 138 of the two outside segments 122 respectively carry thin metal bands 140 and 141 which at one end have opposed longitudinally extending locking surfaces 142 and 143. One of the metal bands has bonded to its outer surface a vinyl sponge member 145 of substantially the same thickness as the segment wall. In locked position the two outside segments 122 of the conduit are held together with the vinyl sponge therebetween and with an elongated drive cleat 146 containing in its channel 147 the two locking surfaces 142 and 143, as best seen in FIG. 14.

It will be immediately recognized that the collapsible structure of the circular conduit of the invention significantly reduces transportation space over that normally used in the shipment of a noncollapsible circular duct. The saving in space becomes especially significant when the collapsible circular conduit is made of three or more segments. A plurality of the collapsible ducts may be shipped in a nesting arrangement as indicated in FIG. 11 within a single carton.

Although exemplary embodiments of the invention have been disclosed herein for purposes of illustration, it will be understood that various changes, modifications, and substitutions may be incorporated in such embodiments without departing from the spirit of the invention as defined by the claims which follow.

I claim:

1. A collapsible, insulated conduit having a rectangular cross section when erected and assuming a sheet form in its unfolded state, said conduit comprising in its collapsed state four, parallel and elongated juxtaposed panels formed of rigid plastic foam material of substantial thickness with the longitudinal edges of adjoining panels on one side of said sheet being beveled to provide therebetween elongated, longitudinal V-shaped notches, a thin, nonperforated, metal structural skin bonded to one side of each panel and extending into adjacent V-notches to substantially the opposite side of said panel with the skin within the V-notches substantially completely covering the walls of said V-notches, said sheet upon being folded at the V-notches to its erected rectangular form defining a conduit having for its four sides the four foam panels with the structural skin of each panel providing an inner wall and being anchored in the corners enclosed by the folded V-notches, said V-notches in the erected conduit having their respective skin-covered faces in abutting engagement, and means for fastening the two edges of the folded sheet together.

2. A conduit in accordance with claim 1 wherein the four panels are separate structures, said four panels being held together in the sheet form by a common structural skin.

3. A collapsible, insulated conduit of circular cross section when erected, and assuming an extended form in its collapsed state, said conduit in its collapsed state comprising at least two segments, each segment being of an arcuate cross section and being made of a rigid plastic foam material, said segments of the conduit in their collapsed state assuming parallel, juxtaposed positions with the edge walls of immediately adjacent panels providing in end view a V-shaped notch, a thin, nonperforated, metal structural skin bonded to the concave inner surface of each segment and substantially completely covering the edge walls of the segments, said structural skin providing a hinge line between adjacent segments lengthwise of the V-notch, and means for fastening the unattached edges of the two outside segments together when the segments are folded to their erected form.

4. A collapsible, insulated conduit, said conduit comprising in its collapsed state several parallel and elongated juxtaposed panels formed of rigid plastic foam material of substantial thickness with the longitudinal edges of adjoining panels being beveled to provide therebetween elongated, longitudinal V-shaped notches, a thin, nonperforated, metal structural member bonded to one side of each panel and extending into adjacent V-notches to substantially the opposite side of said panel with the skin within the V-notches substantially completely covering the walls thereof, said panels being folded at the V-notches to an erected form defining a conduit having for its sides the several foam panels with the thin structural member of each panel providing an inner wall and being anchored in the corners defined by the folded V-notches, said V-notches in the erected conduit having their thin structural member covered faces in abutting engagement, and means for fastening the two edges of the folded panels together.

5. A conduit in accordance with claim 4 wherein a single, elongated thin structural member is employed to cover all the panels.

6. A conduit in accordance with claim 4 wherein the foam plastic material is polyurethane.

7. A conduit in accordance with claim 4 wherein the other sides of the several panels are covered with a thin, strucural skin.

References Cited by the Examiner

UNITED STATES PATENTS

| | | | |
|---|---|---|---|
| 1,162,524 | 11/1915 | Staley et al. | |
| 1,948,232 | 2/1934 | Hall | 138—163 |
| 2,039,886 | 5/1936 | Cohn | 138—158 X |
| 2,310,712 | 2/1943 | Schmied | 229—3.5 |
| 2,489,048 | 11/1949 | Rinehart | 138—158 X |
| 2,770,406 | 11/1956 | Lane | 229—3.5 |

FOREIGN PATENTS

| | | |
|---|---|---|
| 613,433 | 1/1961 | Canada. |
| 4,441 | 2/1909 | Great Britain. |

LAVERNE D. GEIGER, *Primary Examiner.*

LEWIS J. LENNY, EDWARD V. BENHAM,
*Examiners.*